US009286752B2

(12) United States Patent
Robbins et al.

(10) Patent No.: US 9,286,752 B2
(45) Date of Patent: Mar. 15, 2016

(54) DYNAMIC MAPPING OF PHOTO ELEMENTS TO A GAME

(71) Applicant: WMS Gaming, Inc., Waukegan, IL (US)

(72) Inventors: Richard B. Robbins, Glenview, IL (US); Andrew C. Guinn, Chicago, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

(21) Appl. No.: 13/801,824

(22) Filed: Mar. 13, 2013

(65) Prior Publication Data

US 2014/0066198 A1 Mar. 6, 2014

Related U.S. Application Data

(60) Provisional application No. 61/694,635, filed on Aug. 29, 2012.

(51) Int. Cl.
*G07F 17/32* (2006.01)
*A63F 13/00* (2014.01)

(52) U.S. Cl.
CPC ............ *G07F 17/3227* (2013.01); *A63F 13/00* (2013.01); *G07F 17/3211* (2013.01); *G07F 17/3286* (2013.01)

(58) Field of Classification Search
CPC ............ G07F 17/3286; G07F 17/3227; G07F 17/3211; A63F 13/00; A63F 13/60
USPC ...................................................... 463/30, 31
See application file for complete search history.

(56) References Cited

U.S. PATENT DOCUMENTS

| | | | | |
|---|---|---|---|---|
| 6,659,869 | B1 * | 12/2003 | Akamatsu | 463/31 |
| 7,137,892 | B2 * | 11/2006 | Sitrick | 463/31 |
| 7,867,086 | B2 * | 1/2011 | Sitrick | 463/31 |
| 8,100,766 | B2 * | 1/2012 | LeBlanc et al. | 463/31 |
| 8,235,820 | B2 * | 8/2012 | Fine | 463/42 |
| 8,237,743 | B2 * | 8/2012 | Csurka et al. | 345/629 |
| 8,696,425 | B2 * | 4/2014 | Fine | 463/16 |
| 8,764,560 | B2 * | 7/2014 | Sitrick | 463/31 |
| 2003/0083132 | A1 * | 5/2003 | Berg et al. | 463/40 |
| 2003/0148811 | A1 * | 8/2003 | Sitrick | 463/31 |
| 2003/0190954 | A1 * | 10/2003 | Sitrick | 463/35 |
| 2006/0019746 | A1 * | 1/2006 | Seelig et al. | 463/30 |
| 2006/0247039 | A1 | 11/2006 | Lerner et al. | |
| 2008/0085766 | A1 * | 4/2008 | Sitrick | 463/31 |
| 2008/0234049 | A1 * | 9/2008 | LeBlanc et al. | 463/42 |
| 2009/0163267 | A1 * | 6/2009 | Fine | 463/20 |
| 2010/0210358 | A1 * | 8/2010 | Csurka et al. | 463/31 |
| 2011/0014975 | A1 * | 1/2011 | Grabiec et al. | 463/25 |
| 2011/0105229 | A1 * | 5/2011 | Sitrick | 463/31 |
| 2011/0143830 | A1 * | 6/2011 | Fine | 463/20 |
| 2011/0237321 | A1 * | 9/2011 | Fine | 463/16 |

* cited by examiner

*Primary Examiner* — Dmitry Suhol
*Assistant Examiner* — David Duffy
(74) *Attorney, Agent, or Firm* — DeLizio Law, PLLC

(57) ABSTRACT

Systems and methods receive digital images from online sources. The digital images are analyzed and various objects are recognized within the digital images. The recognized objects may be faces of persons appearing in the digital images. A subset of the digital images is selected according to selection rules applied to the recognized objects. The selected recognized objects are incorporated into a wagering game. For example, the recognized objects may be incorporated onto symbols of wagering game.

26 Claims, 10 Drawing Sheets

DYNAMIC MAPPING OF PHOTO ELEMENTS TO A GAME

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2013, WMS Gaming, Inc.

FIELD

Embodiments of the inventive subject matter relate generally to gaming systems, and more particularly to gaming systems that dynamically incorporate various elements of digital images to game assets of wagering games or casual games.

BACKGROUND

Video based games such as video slots, video poker machines and the like, have been a cornerstone of the gaming industry for several years. Such games may be provided on dedicated wagering game machines in casinos or other gaming establishments, they may be server based games that are provided to online gaming clients, or they may be standalone games played on personal computing systems or personal handheld devices. Generally, the popularity of a game depends on the likelihood (or perceived likelihood) of winning the game and the intrinsic entertainment value of the game relative to other available gaming options. Where the available gaming options include a number of competing games and the expectation of winning at each machine is roughly the same (or believed to be the same), players are likely to be attracted to the most entertaining and exciting games. Shrewd operators consequently strive to employ the most entertaining and exciting games, features, and enhancements available because such games attract frequent play and hence increase profitability to the operator or provider of the game. Therefore, there is a continuing need for game developers to continuously develop new games and gaming enhancements that will attract frequent play.

BRIEF DESCRIPTION OF THE FIGURES

Embodiments of the invention are illustrated in the Figures of the accompanying drawings in which.

DESCRIPTION OF THE EMBODIMENTS

This description of the embodiments is divided into five sections. The first section provides an introduction to embodiments of the invention, while the second section describes example wagering game machine architectures. The third section describes example operations performed by some embodiments and the fourth section describes example wagering game machines in more detail. The fifth section presents some general comments.

Introduction

This section provides an introduction to some embodiments of the invention. In general, the embodiments of the invention receive digital image data from any of a variety of sources, recognize objects in the image data, and incorporate the recognized objects into wagering games and casual games. As used herein, a wagering game is one in which monetary value may be wagered, while a casual game is a game where non-monetary value such as points may be wagered or where nothing is wagered, but awards may be provided.

Figure 1:
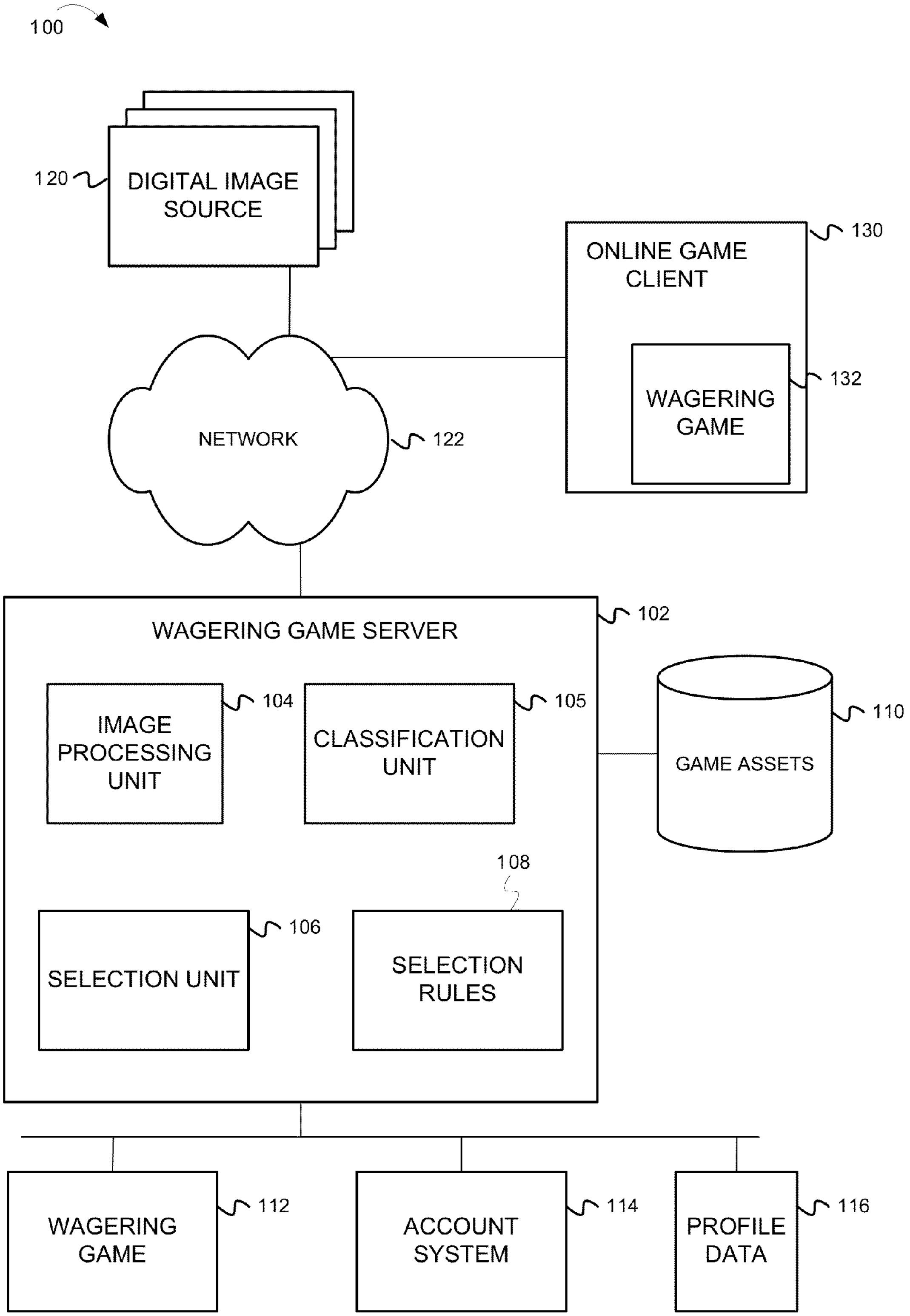
FIG. 1 is a block diagram illustrating components of a system for incorporating elements or object in digital images into a game.

FIG. 1 is a block diagram illustrating components of a system 100 for incorporating elements or object in digital images into a game. In some embodiments, system 100 includes a digital image source 120 communicably coupled to a wagering game server 102 via a network 122. Network 122 may be any type of wired or wireless network, including the Internet.

Digital image source 120 may be any online source that can provide image data such as digital photographs, videos, animations etc. Examples of such sources include photo sharing sites such as Flickr and Instagram; social networking sites such as Facebook, Myspace, Linkedin, and Google+ etc.; and e-commerce sites such as eBay and Amazon etc. Video data may be obtained from the aforementioned social networking and e-commerce sites and from online sources such as YouTube or Vimeo. The foregoing are examples of the types of digital image sources that may be used by the various embodiments. The inventive subject matter is not limited to any particular type of digital image source.

Wagering game server 102 receives image data from one or more digital image sources 120 and processes the image data. In some embodiments, wagering game server 102 includes an image processing unit 104 and a selection unit 106. Image processing unit 104 receives digital images and performs various operations on the image data. In some embodiments, image processing unit 104 performs object recognition on the image data to isolate various components of an image. For example, image processing unit 104 may perform facial recognition in order to isolate faces within a digital image. Other objects, both animate and inanimate, may be recognized and isolated within an image. Image processing unit 104 may create new digital images by cropping or otherwise selecting a portion of the image containing the recognized objects in the digital image. Generally speaking, cropping an object refers to selecting a portion of an image containing the recognized object. For example, cropping a recognized object in an image may isolate the desired relevant portion of the image containing the recognized object by removing or not selecting portions of the image that are not related to the recognized object.

As noted above, the image data may comprise video or animation data obtained from an online source. In some embodiments, image processing unit 104 obtains images from the video data and performs object recognition on images contained within the video or animation data.

Image processing unit 104 may also recognize a place for the image data. Objects in the image data may be used to determine a place for the image data. For example, if the Eiffel tower appears in the image data, then the place may be recognized as Paris, France. Alternatively tags in the image data may be used to determine a place for the image data.

A classification unit 105 may be included in some embodiments. Classification unit 105 analyzes the objects recognized in the images and assigns one or more classifications to the recognized objects. The classification may be relatively simple, such as "person", "place", "animal", "thing" etc., or it may be more complex such as "celebrity", "transportation", "mammal", etc.

Selection unit 106 selects objects from the digital images for inclusion into various game assets 110. In some embodiments, selection unit 106 uses selection rules 108 to determine which objects to include for potential incorporation into game assets 110. The selection rules 108 may specify various characteristics of the digital images and recognized object that are desired. As an example, the selection rules may specify that objects related to a particular theme are to be selected from digital images. The theme may be a user preferred them as specified in profile data 116. Alternatively a game may specify selection rules to be used. For example, the game may specify a theme to be used for object selection. For example, the theme may be a sports theme and the rules may specify that objects that match a sports theme are to be selected. This may result in objects such as sporting equipment and athletes being selected for inclusion in game assets data 110. Alternatively, a transportation theme may cause objects such as cars, bicycles, motorcycles, trains, planes etc. to be selected from digital images for inclusion in game assets 110. The classification provided by classification engine 105 may be used to match selection rules.

The selection rules may also specify a source characteristic. For example, the selection rules may specify that objects in images of items currently being auctioned on eBay that match a particular theme may be selected for incorporation into a wagering game 112.

Game assets 110 is a data store maintaining various components that can be used by a wagering game machine for presenting wagering games. The assets may include image, video and audio data used during various modes of operation of the wagering game machine. The assets may include game symbols or tokens such as reel symbols, card faces and card backs, die face etc.

Wagering game 112 is a wagering game that is communicably coupled to wagering game server 102 and may receive some or all of the assets used to present wagering game 112 on a wagering game machine. Examples of games include slots based games (both video and mechanical) and other video casino games, such as blackjack, keno, poker, blackjack, roulette, etc.

Online game client 130 communicates with wagering game server 102 to present wagering games 132 on online game client 130. Like wagering game 112, wagering game 132 may be any video casino game such as slots, blackjack, keno, poker, blackjack, roulette, etc. Online game client 130 may be any type of computing device, including personal computers, laptop computers, tablet computers, personal digital assistants, mobile phones etc. The embodiments are not limited to any particular computing device.

Further details on the operation of the above described system are provided below. Although FIG. 1 describes some embodiments, the following sections describe many other features and embodiments.

Example Operations

This section describes operations associated with some embodiments of the invention. In the discussion below, the flow diagrams will be described with reference to the block diagrams presented above. However, in some embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flow diagram.

The section will discuss FIGS. 2-5. The discussion of FIG. 2 will describe operations for obtaining objects from digital images and incorporating the objects into a wagering game. The discussion of FIGS. 3-6 will describe further details about using the incorporated objects in various types of wagering games.

Figure 2:
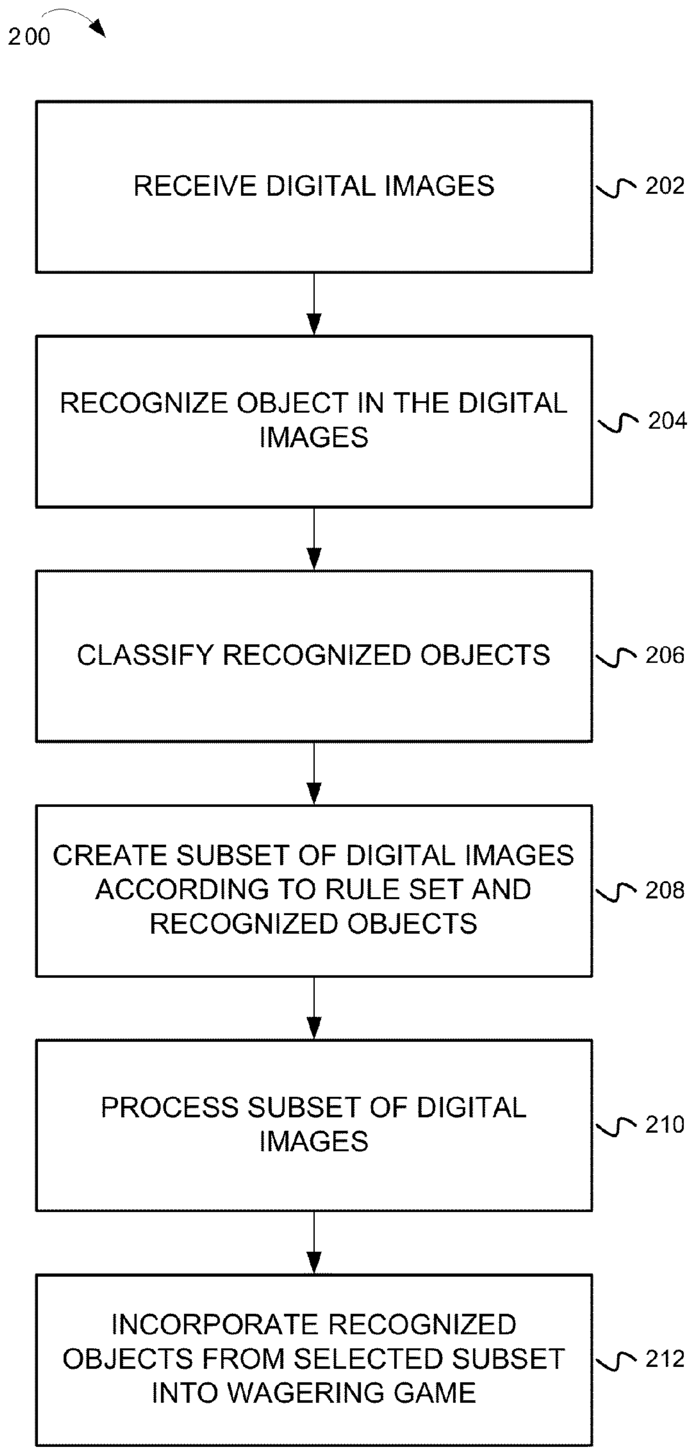
FIG. 2 is a flowchart illustrating a method for incorporating objects obtained from digital images into wagering games.

FIG. 2 is a flowchart illustrating a method 200 for incorporating objects obtained from digital images into wagering games. The method begins at block 202 by receiving digital images from one or more digital image sources. As noted above, the sources may be any network accessible system that can provide digital image data such as photo sharing sites, social networking sites, e-commerce sites, blog servers, sports data systems, etc. In some embodiments, a user may specify the sites that are used to obtain the image data. For example, a user may specify their preferred photo sharing or social networking site. In addition, a user may specify account details such as user name and password details to use to obtain the image data. The user specified parameters may be provided at runtime, or they may be stored in a profile 116 (FIG. 1) for the user.

At block 204, an image processing unit analyzes the received digital images and performs object recognition on the digital images. In some embodiments, the image processing unit performs facial recognition on the digital images. The image processing unit scans the data, and each face in the digital image may be detected and the digital image data may be cropped to create a new image comprising the recognized face (and an area around the face such that the entire head is included). In some embodiments, the digital image data may include metadata allowing the system to associate a name with the recognized face. Other object recognition techniques may be used instead of, or in addition to, facial recognition. For example, an object appearing in the digital data may be identified and cropped so that new image elements are created comprising the recognized object. For example, sports equipment (balls, bats, team logos, etc.) may be recognized. Transportation objects (cars, bikes, planes, trains etc.) may be recognized. The embodiments are not limited to any particular type of object recognition.

In some embodiments, at block 206 the objects recognized in the images are analyzed and assigned one or more classifications. The classification may be relatively simple, such as “person”, “place”, “animal”, “thing” etc., or it may be more complex such as “celebrity”, “transportation”, “mammal”, etc.

At block 208, a selection unit selects images for inclusion into a wagering game. The selection may be driven using rules provided by a user, a casino operator, or both. For example, the rules may indicate to the selection unit that images are to be selected according to a theme. The theme may be user specified or may be selected to match the theme of a wagering game. For example, assume that the rules indicated that a transportation theme is to be used. In this example, the images containing recognized objects associated with transportation may be selected and the objects associated with the theme may be made available for inclusion in a wagering game. Alternatively, assume that a baseball theme has been specified. In this example, object associated with baseball may be selected. For example, baseball equipment or baseball players may be recognized in the image data and the relevant objects cropped from the image data and made available for incorporation into a wagering game. The rules may be complex rules in which multiple conditions must be satisfied.

At block 210 an image processing unit may perform further processing on the selected images. For example, color images may be turned into black and white images and vice versa. Various other effects may be applied. Attributes may be added to the image data to alter the appearance of a face. For example, a moustache or beard may be added, hair may be removed to make the subject appear bald etc. The image may be morphed. For example, facial images for a human may be morphed into an animal face for a wagering game having an animal theme. Composite images may be constructed in which facial images may be composited with celebrity images to make it appear that the user or the user’s social network contacts appear to be in the same picture as the celebrity.

At block 212, the recognized objects are incorporated into a wagering game. The recognized objects may be incorporated into elements of the wagering game that do not affect the outcome, such as visual images that help define a theme for the wagering game. Additionally, the recognized objects may be incorporated into game symbols that contribute to the outcome of a wagering game. For example, the recognized objects may form part of a game symbol such as a reel symbol in a slots game, a card face in a card game, a die face in a dice game or a roulette space on the wheel or table in a roulette game. Those of skill in the art having the benefit of the disclosure will appreciate that other game symbols are possible and within the scope of the inventive subject matter.

It should be noted that the operations described above may be performed at various points in time. For example, in some embodiments, some or all of operations 202-210 may be part of a preprocessing phase of operation in which the operations are performed prior to a player commencing operation of a wagering game. In alternative embodiments, some or all of operations 202-210 may be performed dynamically, that is, during the runtime of a wagering game commenced by a player.

Figure 3:
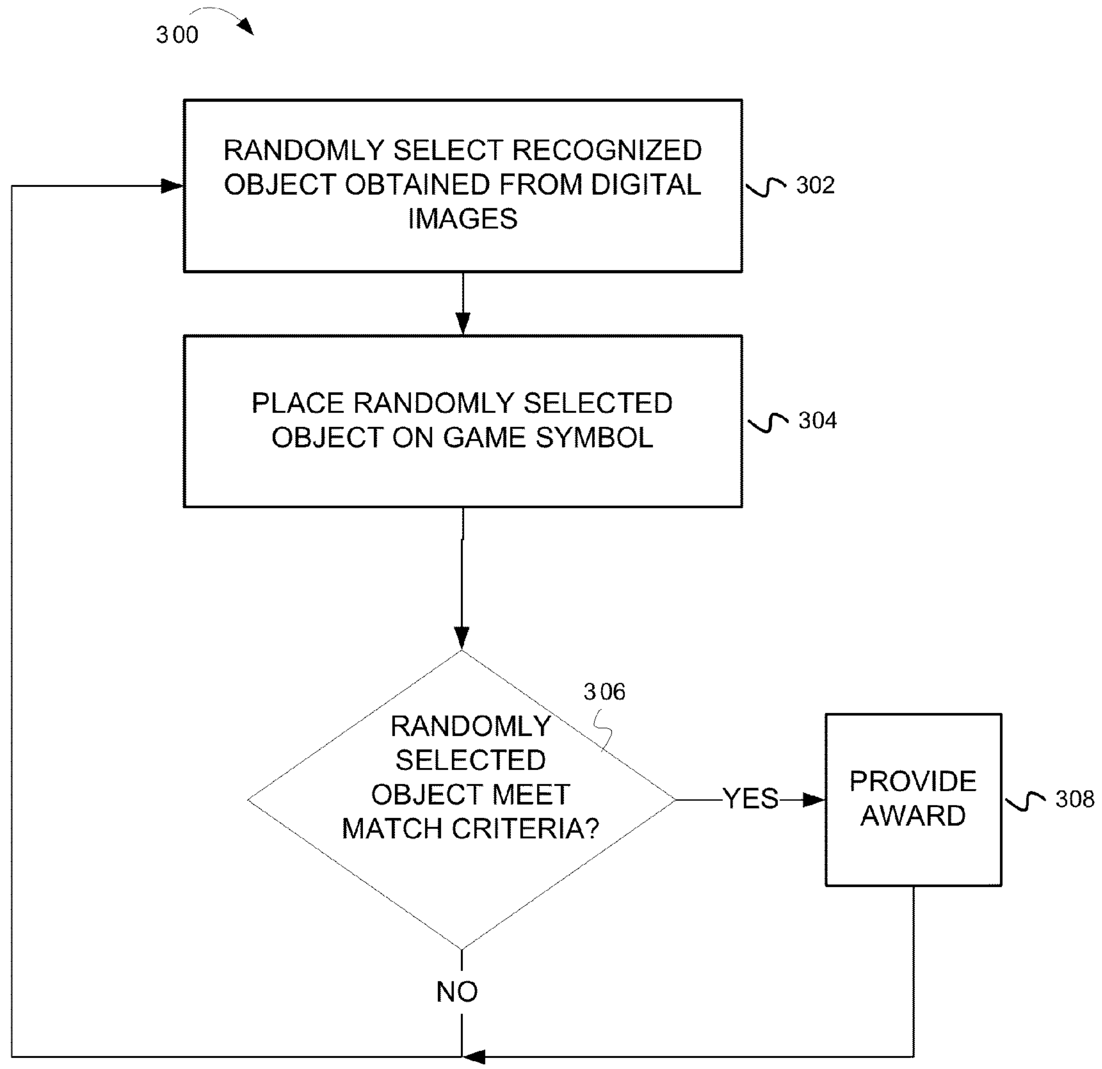
FIG. 3 is a flowchart that provides further details of incorporating recognized images in a wagering game.

FIG. 3 is a flowchart illustrating a method 300 that provides further details on incorporating recognized images in a wagering game. The method begins at block 302 by randomly selecting one or more recognized objects obtained from digital images.

At block 304, the one or more randomly selected objects are placed on game symbols. The placement of a randomly selected object may also be randomly determined.

At block 306, the wagering game determines if the randomly selected object (and possibly the placement of the randomly selected object) meets a match criteria.

At block 308, if the match criteria are met, then at block 308, an award is provided based on the match.

Various types of matching rules may be used. For example, in some embodiments, a match between the identity of the current user of a wagering game and a recognized image of the user may result in the user being awarded credits or points. Alternatively, the award may comprise entry into a bonus round of the wagering game, application of a multiplier to a win amount, unlocking a feature or episode of the wagering game, or some other award. The embodiments are not limited to any particular type of award.

Figure 4:
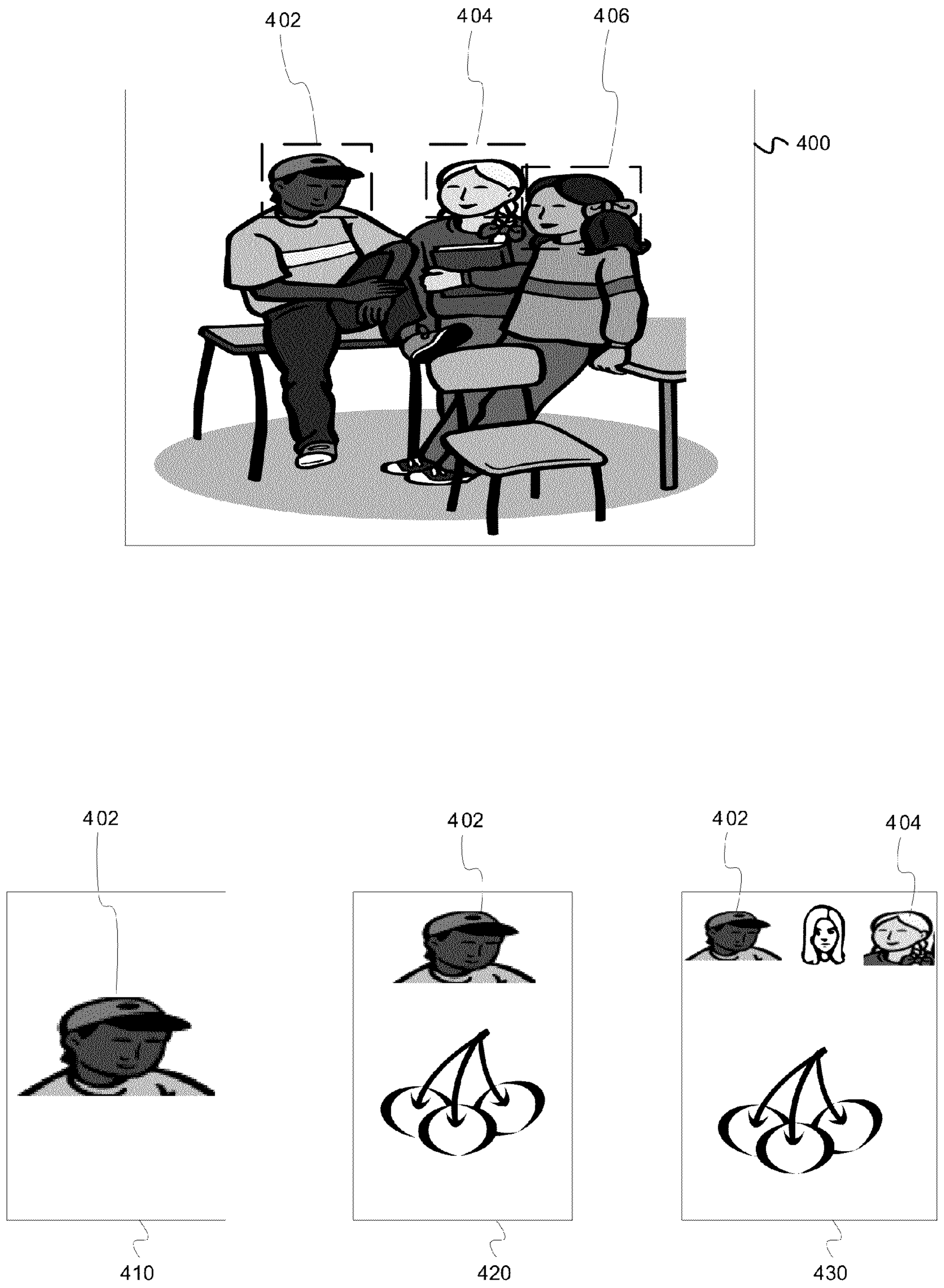
FIG. 4 illustrates the operation of the methods of FIGS. 2 and 3 in a slots game environment.
Figure 5:
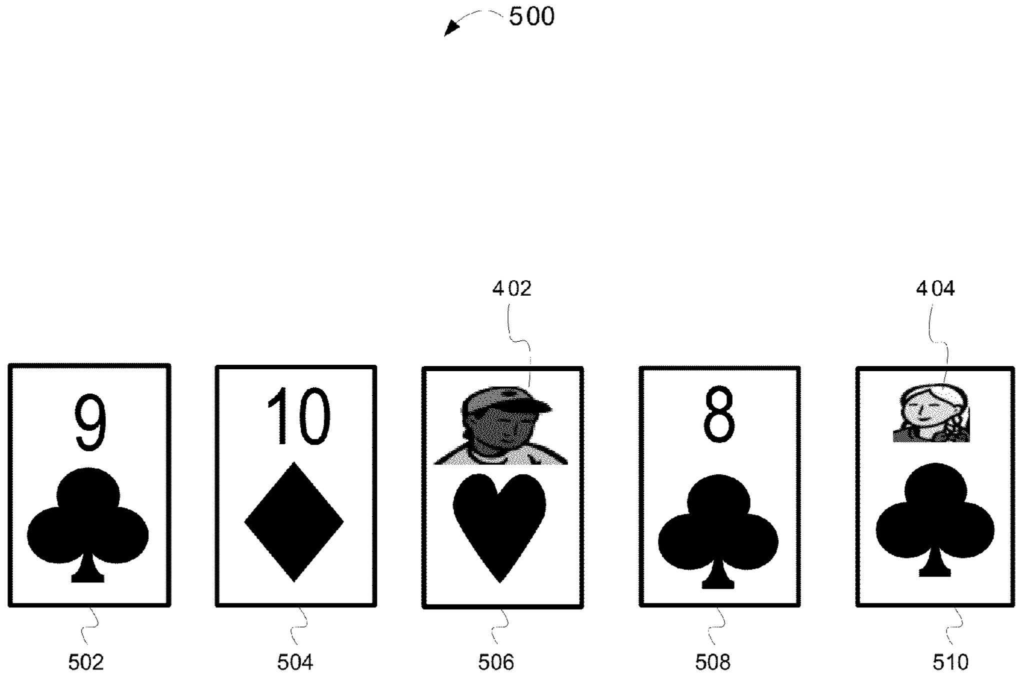
FIG. 5 illustrates an example game in which recognized faces are placed on cards.
Figure 6:
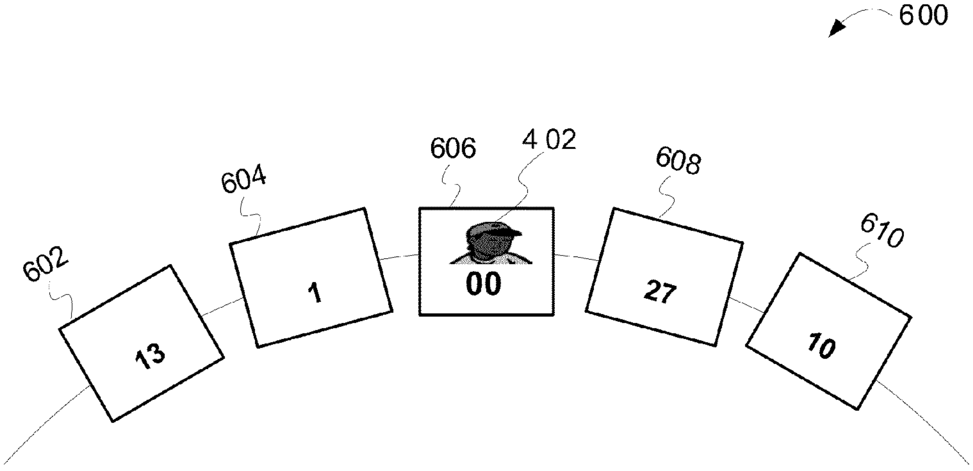
FIG. 6 illustrates an example roulette game having recognized objects incorporated into the game.

FIGS. 4-6 provide examples of the operation of method 300 in the context of particular wagering games.

FIG. 4 illustrates the operation of the method in a slots game environment. Digital image 400 comprises an example photograph that may be obtained from a wagering game users social network site (e.g., Facebook, Myspace, Google+ etc.). The image processing unit recognizes three faces in the image, faces 402, 404 and 406. For the purposes of the example, assume that face 402 is the current wagering game user’s face.

Three example reel symbols 410, 420 and 430 represent different examples of how recognized objects (in this example, faces) may be incorporated into reel symbols. Reel 410 represents a reel symbol of an example game where the recognized object or objects form the reel symbol. Various match algorithms may be applied and various awards may be presented based on successful matches. For example, in some embodiments, the reel symbols may comprise objects recognized from image data having different categories (current user, friends of the current user, relatives of the current user etc.) A paytable may be constructed using the categories and desired expected values. Random outcomes using the recognized objects on the reel symbols and the paytable determine an award amount, if any, to be provided to the user. In alternative embodiments, the appearance of a recognized object may trigger a bonus round or unlock a feature of the wagering game, but not affect the payout amount.

In some embodiments, the wagering game incorporates high symbols, medium symbols and low symbols along with a bonus symbol and a wild symbol. High symbols are associated with high payout amounts, medium symbols are associated with medium payout amounts, and low symbols are associated with low payout amounts. The math model 128 associated with the symbol hierarchy may be a predetermined math model (i.e., each reel strip has a predetermined layout of symbols so as to yield winning symbol combinations having associated payouts and probabilities of occurrence, thereby yielding a slot game with a predetermined overall payback percentage, e.g., 90%). Winning symbol combinations may, for example, be three, four, and five occurrences of a particular symbol appearing “left-to-right” along an active payline. In some embodiments, various recognized objects may be mapped to high, medium and low paying symbols, and the graphical image for the symbol may comprise the recognized object cropped from a digital image. As an example, faces cropped from pictures may be mapped to high, medium and low symbols according to a degree of interactivity with the current player. As an example, recognized faces associated with social contacts having a high, medium or low degree of interactivity with the current player may be mapped to high symbols, medium symbols and low symbols respectively.

A recognized face associated with social contact with the highest degree of interactivity may be mapped to a bonus or wild symbol. A bonus symbol, if it appears on a reel, causes a bonus game to commence. In some embodiments, a predetermined number of bonus symbols, e.g., three, are required in order to trigger a bonus game. Depending upon the desired game design, the bonus symbols may or may not need to appear along an active payline in order to trigger a bonus game. A wild symbol matches any symbol, with the potential exception of the bonus symbol.

In some embodiments, if a recognized face appears in a symbol associated with a win, a posting is made to the social network indicating that the person associated with the face helped the current player win.

Similarly, recognized faces of sports figures appearing in digital images may be mapped to symbols based on their performance data, with faces associated with high performing players mapped to high symbols, medium performing player mapped to medium symbols, and low performing player mapped to low symbols. Recognized faces associated with highest performing player may be mapped to bonus or wild symbols.

Reel 420 represents an example slots game in which recognized objects may be placed on a reel position as an icon in addition to the symbol normally associated with the reel. In the example shown, face 420 has been associated with a cherry reel symbol. In some embodiments, if the face appearing as an icon on a reel symbol matches the current user, an award may be provided to the current user. The award may be a cash amount credited to the user on the wagering game machine or the user's account maintained by account system 114. Alternatively, the award may be entry into a bonus round, a credit multiplier, or unlocking a feature of the wagering game. In some embodiments, the appearance of a face on a reel symbol may result in a reward being provided to the person associated with the face. For example assume that face 402 in reel 420 is not that of the current user, but is recognized as a face belonging to a user having a profile registered with the casino operator. The user may be awarded a cash amount or other award even though the user is not currently playing the wagering game.

Reel 430 represent an example slots game in which multiple recognized objects may be placed as icons on a reel symbol. In the example illustrated by reel 430, faces 402 and 404 along with another unrelated face 432 have been placed on a reel symbol. Assume that face 402 is the current player and face 404 is that of a user not currently playing, but having a profile in profile database 116. The appearance of faces 402 and 404 may cause both users to be provided awards. In addition, the reward amount may be enhanced based on their appearance on the same reel.

It should be noted that the icons appearing on a reel 420 or 430 may be small compared to the reel symbol. In some embodiments, the icons comprising recognized objects from image data may be highlighted. For example, the icon may be made to rotate, blink or the border of the icon may be made to flash or blink. Further, the background color of the icon may be a different color than the reel background in order to highlight the icon on the reel.

FIG. 5 illustrates an example game in which recognized faces are placed on cards. In the examples shown, faces 402 and 404 have been placed on the aces in the current hand. As in the slots example described above, the appearance of a face may trigger an award if the face meets match criteria. In some embodiments, the appearance of a face of a current user may trigger an award of cash or entry into a bonus round for the current user. Similarly, the appearance of a face of a registered player that is not currently playing may trigger an award of cash to the player.

FIG. 6 illustrates an example roulette game having recognized objects incorporated into the game. In some embodiments, a recognized object replaces a roulette position. In example roulette wheel 600, the "00" position has been associated with face 402 that was obtained using facial recognition performed on a digital image. In some embodiments, if the "00" position is the winning position, a jackpot is awarded if the face is that of a current player. In alternative embodiments, a current player may place images of social contacts on one or more positions of the roulette betting board. The faces are then associated with the corresponding wheel positions. If the winning position is associated with a face, the current player may be awarded an amount in addition to the normal winning amount for the position. In addition, the social contact associated with the wheel position may also be provided an award.

The inventive subject matter described above has been presented in the context of recognized objects in image data obtained from various online source and incorporating the recognized objects into wagering games. In some embodiments, similar technique can be applied to audio data.

Figure 7:
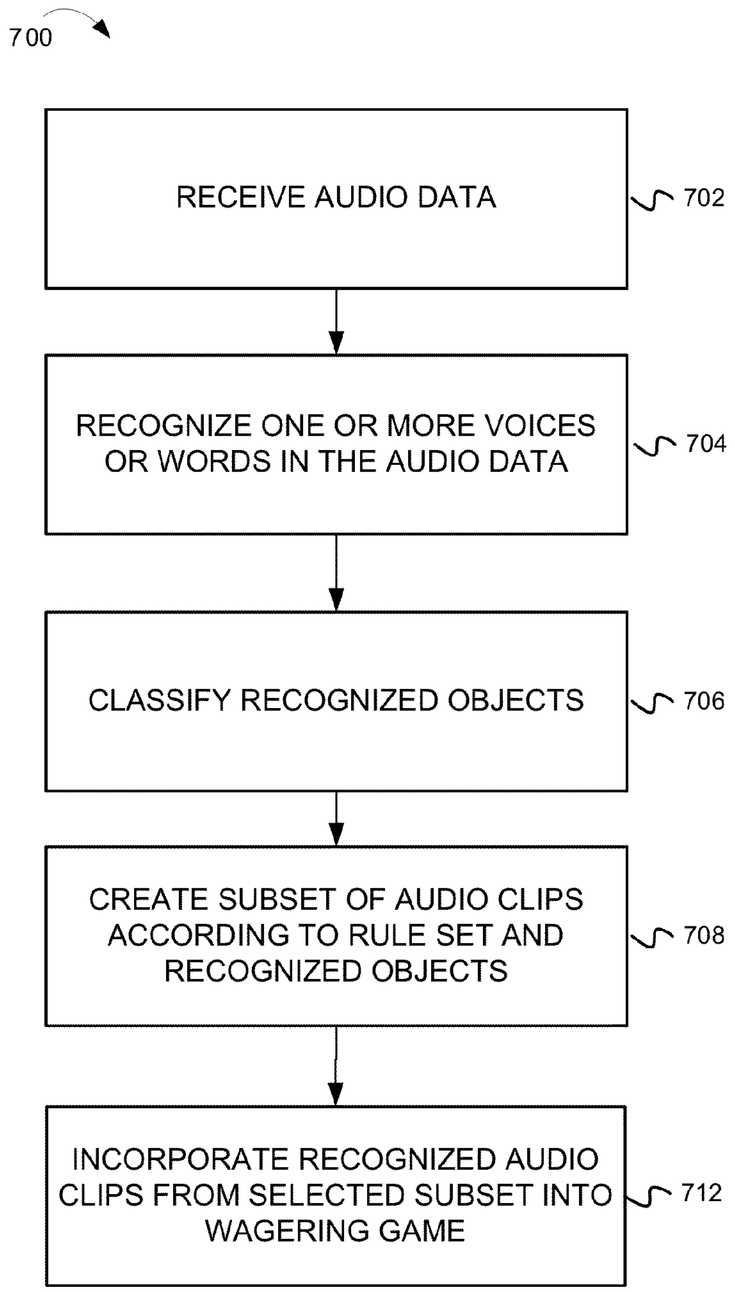
FIG. 7 is a flowchart illustrating a method for incorporating audio objects obtained from digital audio sources into wagering games.

FIG. 7 is a flowchart illustrating a method 700 for incorporating audio objects obtained from digital audio sources into wagering games. The method begins at block 702 by receiving digital audio data from one or more digital audio sources. As with the image and video data described above, the audio data may be obtained from online sources. For example, the audio data may be obtained from online video data that includes both audio and video portions. Similarly, audio data may be obtained from live audio streams of conversations, for example, an audio chat session. In some embodiments, a user may specify the sites that are used to obtain the image data. For example, a user may specify their preferred photo sharing or social networking site. In addition, a user may specify account details such as user name and password details to use to obtain the image data. The user specified parameters may be provided at runtime, or they may be stored in a profile 116 (FIG. 1) for the user.

At block 704, the digital audio data is analyzed and the system recognizes aspects of the audio data. For example, the system may recognize music being played (e.g., the title or performer), words within the audio data, or one or more speakers in the audio data. In some embodiments, the audio data may include metadata allowing the system to associate a name, performer or title with the audio data. Audio clips may be obtained from the audio data based on the analysis. The clip may be obtained based words recognized in the audio clip, the identity of the person speaking in the audio clip etc.

In some embodiments, at block 706 the audio clip is analyzed and assigned one or more classifications. For example, the classification may be based on the identity of the person speaking in the clip (political figure, sports figure, actor etc.), the theme of music identified in the clip (classical, pop, jazz etc.), words in the clip etc.

At block 708, a selection unit selects audio clips for inclusion into a wagering game. As with the image data described above, the selection may be driven using rules provided by a user, a casino operator, or both. For example, the rules may indicate to the selection unit that audio clips are to be selected according to a theme. The theme may be user specified or may be selected to match the theme of a wagering game. For example, in a game having a sports them, audio clips of sports events or sports figures may be selected.

At block 712, the recognized and selected audio clips are incorporated into a wagering game. The recognized objects may be incorporated into elements of the wagering game that do not affect the outcome, such as audio portions associated with a theme for the wagering game. Additionally, the recognized audio clips may be incorporated into game symbols that contribute to the outcome of a wagering game. For example, the recognized audio clip may be associated with a game symbol such as a reel symbol in a slots game, a card face in a card game, a die face in a dice game or a roulette space on the wheel or table in a roulette game. Those of skill in the art having the benefit of the disclosure will appreciate that other game symbols are possible and within the scope of the inventive subject matter. The audio clips may be played when the symbol is part of a winning outcome, for example, a winning payline in a slots based game or a winning hand in a card based game.

It should be noted that the operations described above may be performed at various points in time. For example, in some embodiments, some or all of operations 702-708 may be part of a preprocessing phase of operation in which the operations are performed prior to a player commencing operation of a wagering game. In alternative embodiments, some or all of operations 702-708 may be performed dynamically, that is, during the runtime of a wagering game commenced by a player.

It should be noted that while the above described operations have been described in the context of a wagering game, the same inventive concepts can be applied to casual games (i.e., games where non-monetary value is awarded such as points, loyalty points, or other non-monetary awards).

Operating Environment

This section describes an example operating environment and presents structural aspects of some embodiments. This section includes discussion about wagering game machine architectures and wagering game networks

Wagering Game Machine Architectures

Figure 8:
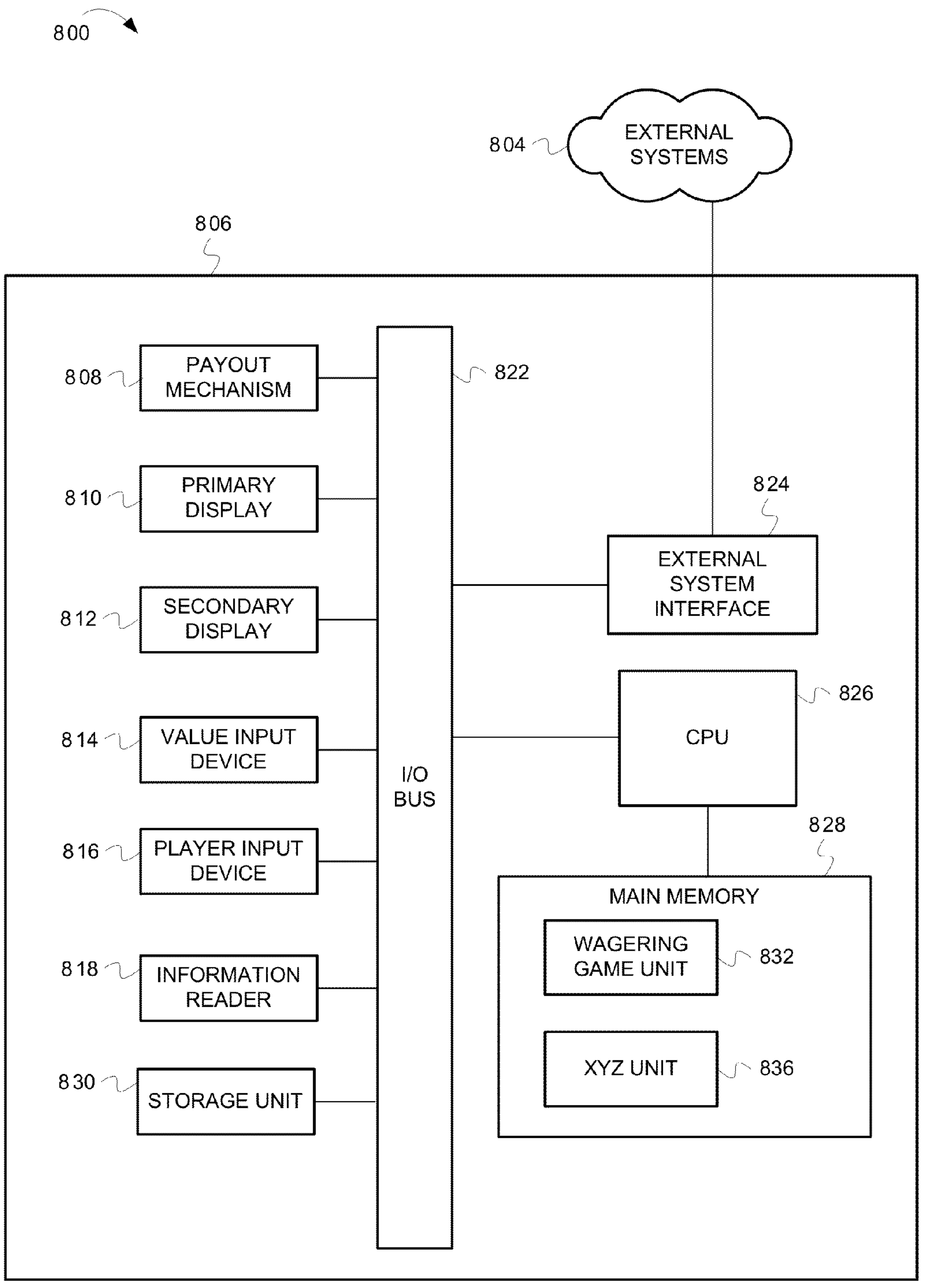
FIG. 8 is a block diagram illustrating a wagering game machine architecture, according to example embodiments of the invention.

FIG. 8 is a block diagram illustrating a wagering game machine architecture, according to example embodiments of the invention. As shown in FIG. 8, the wagering game machine architecture 800 includes a wagering game machine 806, which includes a central processing unit (CPU) 826 connected to main memory 828. The CPU 826 can include any suitable processor, such as an Intel® Pentium processor, Intel® Core 2 Duo processor, AMD Opteron™ processor, or UltraSPARC processor. The main memory 828 includes a wagering game unit 832. In one embodiment, the wagering game unit 832 can present wagering games, such as video poker, video black jack, video slots, video lottery, etc., in whole or part.

The CPU 826 is also connected to an input/output (I/O) bus 822, which can include any suitable bus technologies, such as an AGTL+ frontside bus and a PCI backside bus. The I/O bus 822 is connected to a payout mechanism 808, primary display 810, secondary display 812, value input device 814, player input device 816, information reader 818, and storage unit 830. The player input device 816 can include the value input device 814 to the extent the player input device 816 is used to place wagers. The I/O bus 822 is also connected to an external system interface 824, which is connected to external systems 804 (e.g., wagering game networks).

In one embodiment, the wagering game machine 806 can include additional peripheral devices and/or more than one of each component shown in FIG. 8. For example, in one embodiment, the wagering game machine 806 can include multiple external system interfaces 824 and/or multiple CPUs 826. In one embodiment, any of the components can be integrated or subdivided.

Any component of the architecture 800 can include hardware, firmware, and/or machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

While FIG. 8 describes an example wagering game machine architecture, this section continues with a discussion wagering game networks.

Wagering Game Networks

Figure 9:
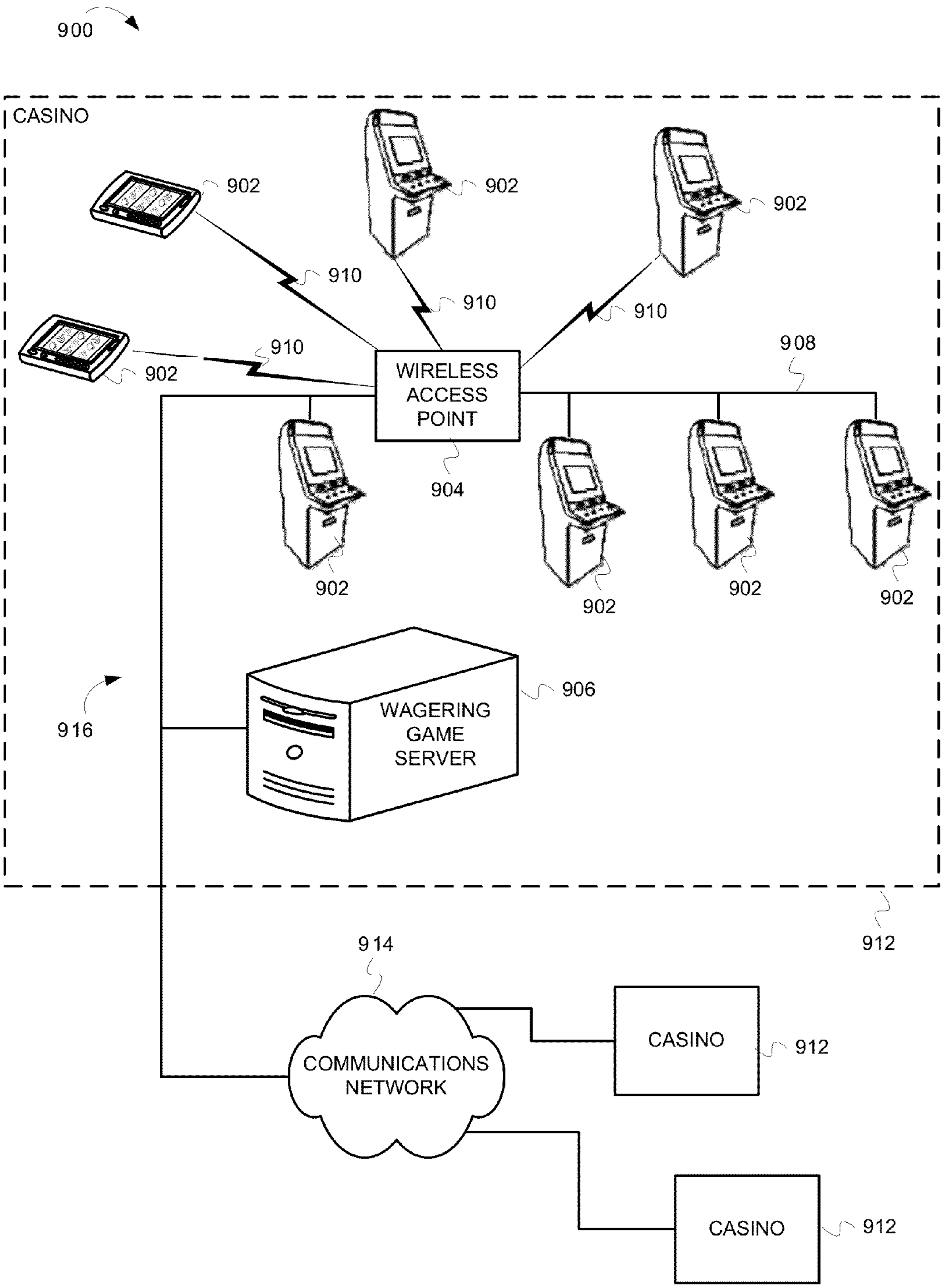
FIG. 9 is a block diagram illustrating a wagering game network, according to example embodiments of the invention.

FIG. 9 is a block diagram illustrating a wagering game network 900, according to example embodiments of the invention. As shown in FIG. 9, the wagering game network 900 includes a plurality of casinos 912 connected to a communications network 914.

Each casino 912 includes a local area network 916, which includes an access point 904, a wagering game server 906, and wagering game machines 902. The access point 904 provides wireless communication links 910 and wired communication links 908. The wired and wireless communication links can employ any suitable connection technology, such as Bluetooth, 802.11, Ethernet, public switched telephone networks, SONET, etc. In some embodiments, the wagering game server 906 can serve wagering games and distribute content to devices located in other casinos 912 or at other locations on the communications network 914.

The wagering game machines 902 described herein can take any suitable form, such as floor standing models, handheld mobile units, bartop models, workstation-type console models, etc. Further, the wagering game machines 902 can be primarily dedicated for use in conducting wagering games, or can include non-dedicated devices, such as mobile phones, personal digital assistants, personal computers, etc. In one embodiment, the wagering game network 900 can include other network devices, such as accounting servers, wide area progressive servers, player tracking servers, and/or other devices suitable for use in connection with embodiments of the invention.

In some embodiments, wagering game machines 902 and wagering game servers 906 work together such that a wagering game machine 902 can be operated as a thin, thick, or intermediate client. For example, one or more elements of game play may be controlled by the wagering game machine 902 (client) or the wagering game server 906 (server). Game play elements can include executable game code, lookup tables, configuration files, game outcome, audio or visual representations of the game, game assets or the like. In a thin-client example, the wagering game server 906 can perform functions such as determining game outcome or managing assets, while the wagering game machine 902 can present a graphical representation of such outcome or asset modification to the user (e.g., player). In a thick-client example, the wagering game machines 902 can determine game outcomes and communicate the outcomes to the wagering game server 906 for recording or managing a player's account.

In some embodiments, either the wagering game machines 902 (client) or the wagering game server 906 can provide functionality that is not directly related to game play. For example, account transactions and account rules may be managed centrally (e.g., by the wagering game server 906) or locally (e.g., by the wagering game machine 902). Other functionality not directly related to game play may include power management, presentation of advertising, software or firmware updates, system quality or security checks, etc.

Any of the wagering game network components (e.g., the wagering game machines 902) can include hardware and machine-readable media including instructions for performing the operations described herein.

Example Wagering Game Machine

Figure 10:
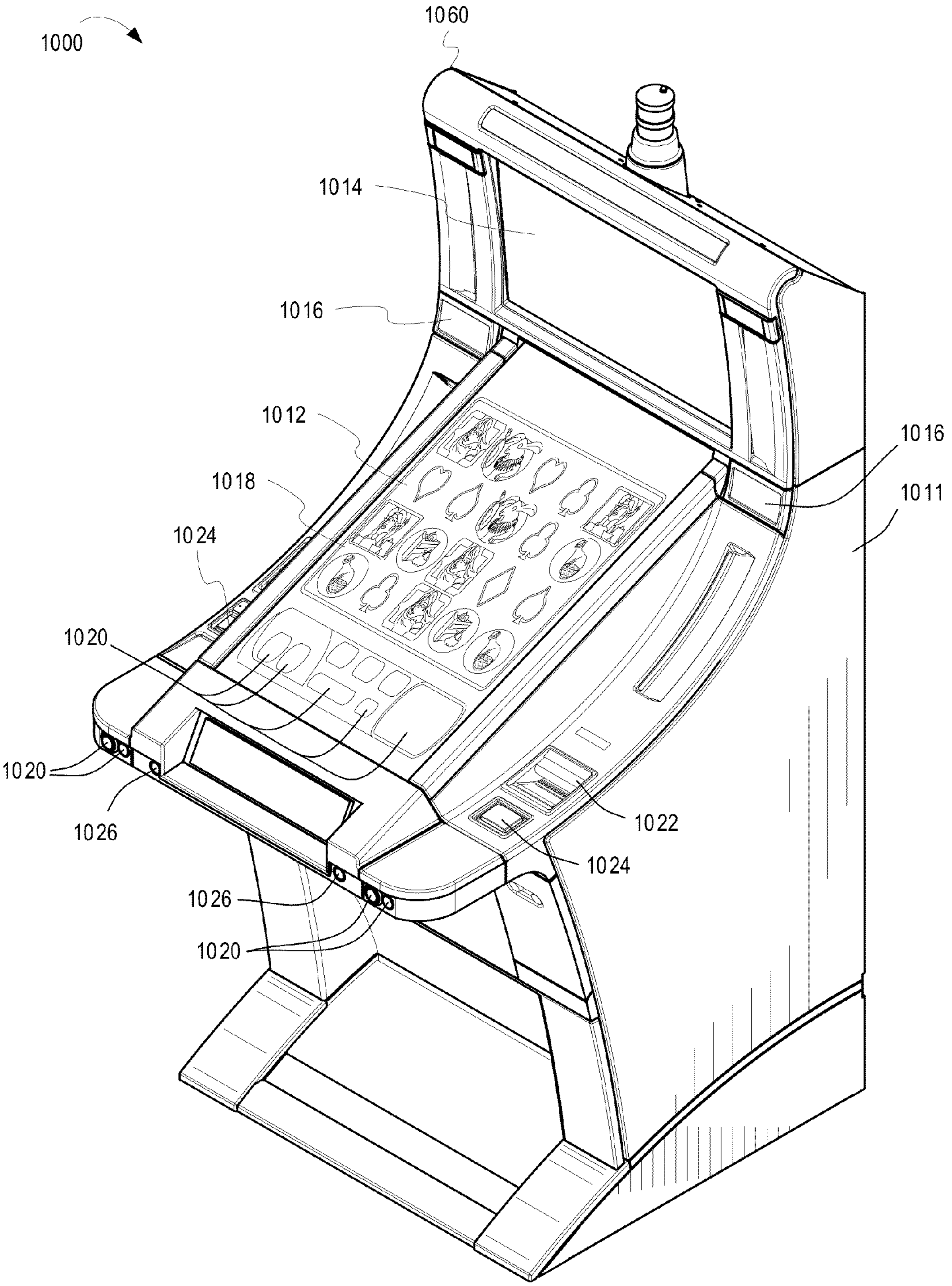
FIG. 10 is a perspective view of a wagering game machine, according to example embodiments of the invention.

FIG. 10 is a conceptual diagram that illustrates an example of a wagering game system 1000, according to some embodiments. In FIG. 10, the wagering game system 1000 includes a wagering game machine 1060 similar to those used in gaming establishments, such as casinos. The wagering game machine 1060 may, in some examples, be referred to as a gaming terminal or an electronic gaming machine. The wagering game machine 1060 may have varying structures and methods of operation. For example, the wagering game machine 1060 may include electromechanical components configured to play mechanical slots. In another example, the 1060 includes electronic components configured to play a video casino game, such as slots, keno, poker, blackjack, roulette, craps, etc. The wagering game machine 1060 is depicted as a floor-standing model. However, other examples of wagering game machines include handheld mobile units, bartop models, workstation-type console models, etc. Further, the wagering game machine 1060 may be primarily dedicated for use in conducting wagering games, or may include non-dedicated devices, such as mobile phones, personal digital assistants, personal computers, etc. Exemplary types of wagering game machines are disclosed in U.S. Pat. No. 6,517,433 and Patent Application Publication Nos. US2010/0062196 and US2010/0234099, which are incorporated herein by reference in their entireties.

The wagering game machine 1060 illustrated in FIG. 10 comprises a cabinet 1011 that may house various input devices, output devices, and input/output devices. By way of example, the wagering game machine 1060 includes a primary display area 1012, a secondary display area 1014, and one or more audio speakers 1016. The primary display area 1012 or the secondary display area 1014 may include one or more of a cathode ray tube (CRT), a high resolution liquid crystal display (LCD), a plasma display, a light emitting diode (LED) display, a three-dimensional (3D) display, a video display, or a combination thereof. In some examples, the primary display area 1012 or the secondary display area 1014 includes mechanical reels to display a wagering game outcome. In some example, the primary display area 1012 or the secondary display area 1014 present a transmissive video display disposed in front of a mechanical-reel display to portray a video image superimposed upon the mechanical-reel display. In FIG. 10, the wagering game machine 1060 is a "slant-top" version in which the primary display 1012 is slanted (e.g., at about a thirty-degree angle toward the player of the wagering game machine 1060). Another example of wagering game machine 1060 is an "upright" version in which the primary display 1014 is oriented vertically relative to the player. The display areas may variously display information associated with wagering games, non-wagering games, community games, progressives, advertisements, services, premium entertainment, text messaging, emails, alerts, announcements, broadcast information, subscription information, etc. appropriate to the particular mode(s) of operation of the wagering game machine 1060. The wagering game machine 1060 includes a touch screen(s) 1018 mounted over the primary or secondary areas, buttons 1020 on a button panel, bill validator 1022, information reader/writer(s) 1024, and player-accessible port(s) 1026 (e.g., audio output jack for headphones, video headset jack, USB port, wireless transmitter/receiver, etc.). It should be understood that numerous other peripheral devices and other elements exist and are readily utilizable in any number of combinations to create various forms of a wagering game machine in accord with the present concepts.

Input devices, such as the touch screen 918, buttons 920, a mouse, a joystick, a gesture-sensing device, a voice-recognition device, and a virtual input device, accept player input(s) and transform the player input(s) to electronic data signals indicative of the player input(s), which correspond to an enabled feature for such input(s) at a time of activation (e.g., pressing a "Max Bet" button or soft key to indicate a player's desire to place a maximum wager to play the wagering game). The input(s), once transformed into electronic data signals, are output to a CPU for processing. The electronic data signals are selected from a group consisting essentially of an electrical current, an electrical voltage, an electrical charge, an optical signal, an optical element, a magnetic signal, and a magnetic element.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer readable program code embodied in the medium. The described embodiments may be provided as a computer program product that may include a machine-readable storage medium having stored thereon instructions, which may be used to program a computer system to perform a process according to embodiments(s), whether presently described or not, because every conceivable variation is not enumerated herein. A machine-readable storage medium includes any mechanism that stores information in a form readable by a machine (e.g., a wagering game machine, computer, etc.). For example, machine-readable storage media includes read only memory (ROM), random access memory (RAM), magnetic disk storage media, optical storage media (e.g., CD-ROM), flash memory machines, erasable programmable memory (e.g., EPROM and EEPROM); etc. Some embodiments of the invention can also include machine-readable signal media, such as any media suitable for transmitting software over a network.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method for incorporating recognized objects in images into a wagering game, the method comprising:

receiving, into a non-transitory machine-readable storage medium, a plurality of digital images;

recognizing, by one or more processors, one or more objects in one or more of the plurality of digital images;

selecting, by the one or more processors, a subset of the plurality of digital images according to one or more selection rules stored in the non-transitory machine-readable storage medium and the one or more objects;

selecting, by the one or more processors, one or more image portions of the subset of the plurality of digital images, the one or more image portions corresponding to the one or more objects;

incorporating, by the one or more processors, the one or more image portions corresponding to the one or more objects into the wagering game; and randomly selecting, based at least in part on an output of a random element generator, an outcome for the wagering game with the one or more image portions incorporated into the wagering game.

2. The method of claim 1, wherein recognizing the one or more objects includes recognizing one or more faces in the plurality of digital images.

3. The method of claim 1, and further comprising cropping at least one image of the subset of the plurality of digital images to exclude objects other than a recognized object.

4. The method of claim 1, and further comprising associating a classification to at least one of the one or more objects, wherein said selecting the subset of the plurality of digital images includes selecting the subset based, at least in part, on the classification.

5. The method of claim 1, wherein selecting the subset of the plurality of digital images includes selecting digital images according to data indicating a theme of the digital images, wherein the data indicating the theme of the digital images matches data indicating a theme of the wagering game.

6. The method of claim 1, wherein receiving the plurality of digital images includes receiving the plurality of digital images from a user selected source.

7. The method of claim 1, wherein incorporating at least one of the one or more image portions corresponding to the one or more objects into the wagering game includes incorporating the one or more image portions corresponding to the one or more objects into one or more symbols of the wagering game.

8. The method of claim 7, and further comprising:

determining if at least one of the one or more objects incorporated into the one or more symbols of the wagering game satisfies a match criteria; and in response to determining that the at least one of the one or more objects satisfies the match criteria, providing an award based on the match criteria.

9. The method of claim 7, and further comprising providing an award determined in accordance with a number of recognized objects appearing on symbols presented on a display for the wagering game.

10. A system for incorporating recognized objects in images into a wagering game, the system comprising:

at least one processor; and at least one memory device storing instructions, that when executed by the at least one processor, cause the system to:

receive a plurality of digital images;

recognize one or more objects in one or more of the plurality of digital images;

select a subset of the plurality of digital images according to one or more selection rules and the one or more objects;

select one or more image portions of the subset of the plurality of digital images, the one or more image portions corresponding to the one or more objects;

incorporate the one or more image portions corresponding to the one or more objects into the wagering game; and randomly select, based at least in part on an output of a random element generator, an outcome for the wagering game with the one or more image portions incorporated into the wagering game.

11. The system of claim 10, wherein the one or more objects comprise one or more faces in the digital images.

12. The system of claim 10, wherein the at least one memory device further stores instructions, that when executed by the processor, cause the system to crop at least one image of the subset of the plurality of digital images to exclude objects other than a recognized object.

13. The system of claim 10, wherein the at least one memory device further stores instructions, that when executed by the processor, cause the system to determine a classification for the one or more objects.

14. The system of claim 10, wherein the instructions to select the subset of the plurality of digital images include instructions to select digital images according to data indicating a theme of the digital images, wherein the data indicating the theme of the digital images matches data indicating a theme of the wagering game.

15. The system of claim 10, wherein the instructions to receive the plurality of digital images include instructions to receive the plurality of digital images from a user selected source.

16. The system of claim 10, wherein the instructions to incorporate at least one of the one or more image portions corresponding to the one or more objects into the wagering game include instructions to incorporate the one or more image portions corresponding to the one or more objects into one or more symbols of the wagering game.

17. The system of claim 16, wherein the at least one memory device further stores instructions, that when executed by the processor, cause the system to:

determine if at least one of the one or more objects incorporated into the one or more symbols of the wagering game satisfies a match criteria; and in response to determining that the at least one of the one or more objects satisfies the match criteria, provide an award based on the match criteria.

18. A non-transitory machine-readable storage medium having stored thereon machine executable instructions for causing one or more processors to perform operations comprising:

receiving a plurality of digital images;

recognizing, by the one or more processors, one or more objects in one or more of the plurality of digital images;

selecting a subset of the plurality of digital images according to one or more selection rules and the one or more objects;

selecting one or more image portions of the subset of the plurality of digital images, the one or more image portions corresponding to the one or more objects;

incorporating the one or more image portions corresponding to the one or more objects into a wagering game; and randomly selecting, based at least in part on an output of a random element generator, an outcome for the wagering game with the one or more image portions incorporated into the wagering game.

19. The non-transitory machine-readable storage medium of claim 18, wherein recognizing the one or more objects includes recognizing one or more faces in the plurality of digital images.

20. The non-transitory machine-readable storage medium of claim 18, wherein the operations further comprise cropping at least one image of the subset of the plurality of digital images to exclude objects other than a recognized object.

21. The non-transitory machine-readable storage medium of claim 18, wherein the operations further comprise associating a classification to the one or more objects.

22. The non-transitory machine-readable storage medium of claim 18, wherein selecting the subset of the plurality of digital images includes selecting digital images according to data indicating a theme of the digital images, wherein the data indicating the theme of the digital images matches data indicating a theme of the wagering game.

23. The non-transitory machine-readable storage medium of claim 18, wherein receiving the plurality of digital images includes receiving the plurality of digital images from a user selected source.

24. The non-transitory machine-readable storage medium of claim 18, wherein incorporating at least one of the one or more image portions corresponding to the one or more objects into the wagering game includes incorporating the one or more image portions corresponding to the one or more objects into one or more symbols of the wagering game.

25. The non-transitory machine-readable storage medium of claim 24, wherein the operations further comprise:

determining if at least one of the one or more objects incorporated into the one or more symbols of the wagering game satisfies a match criteria; and in response to determining that the at least one of the one or more objects satisfies the match criteria, providing an award based on the match criteria.

26. The non-transitory machine-readable storage medium of claim 24, wherein the operations further comprise providing an award determined in accordance with a number of recognized objects appearing on symbols presented on a display for the wagering game.

* * * * *